Patented Sept. 17, 1946

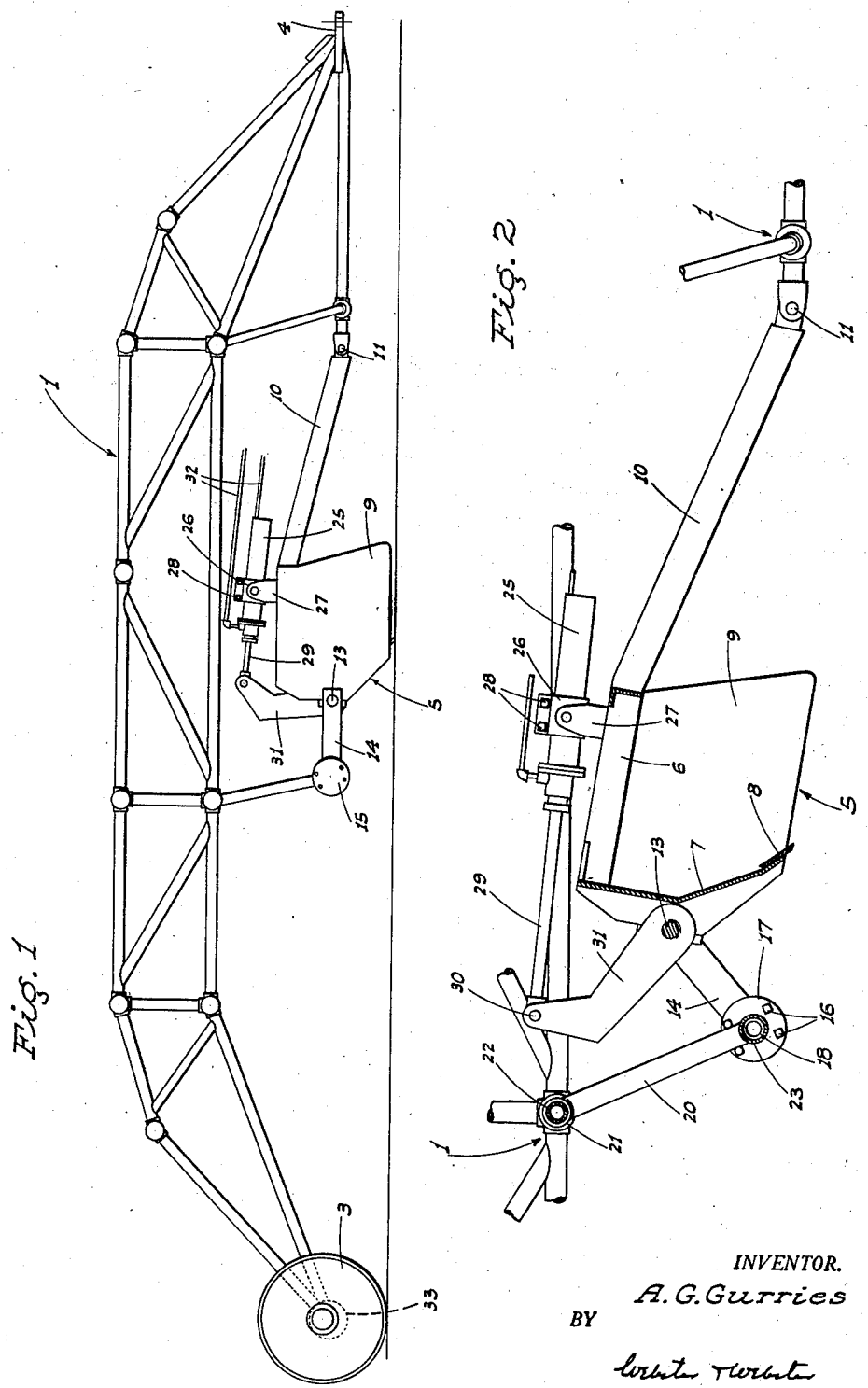

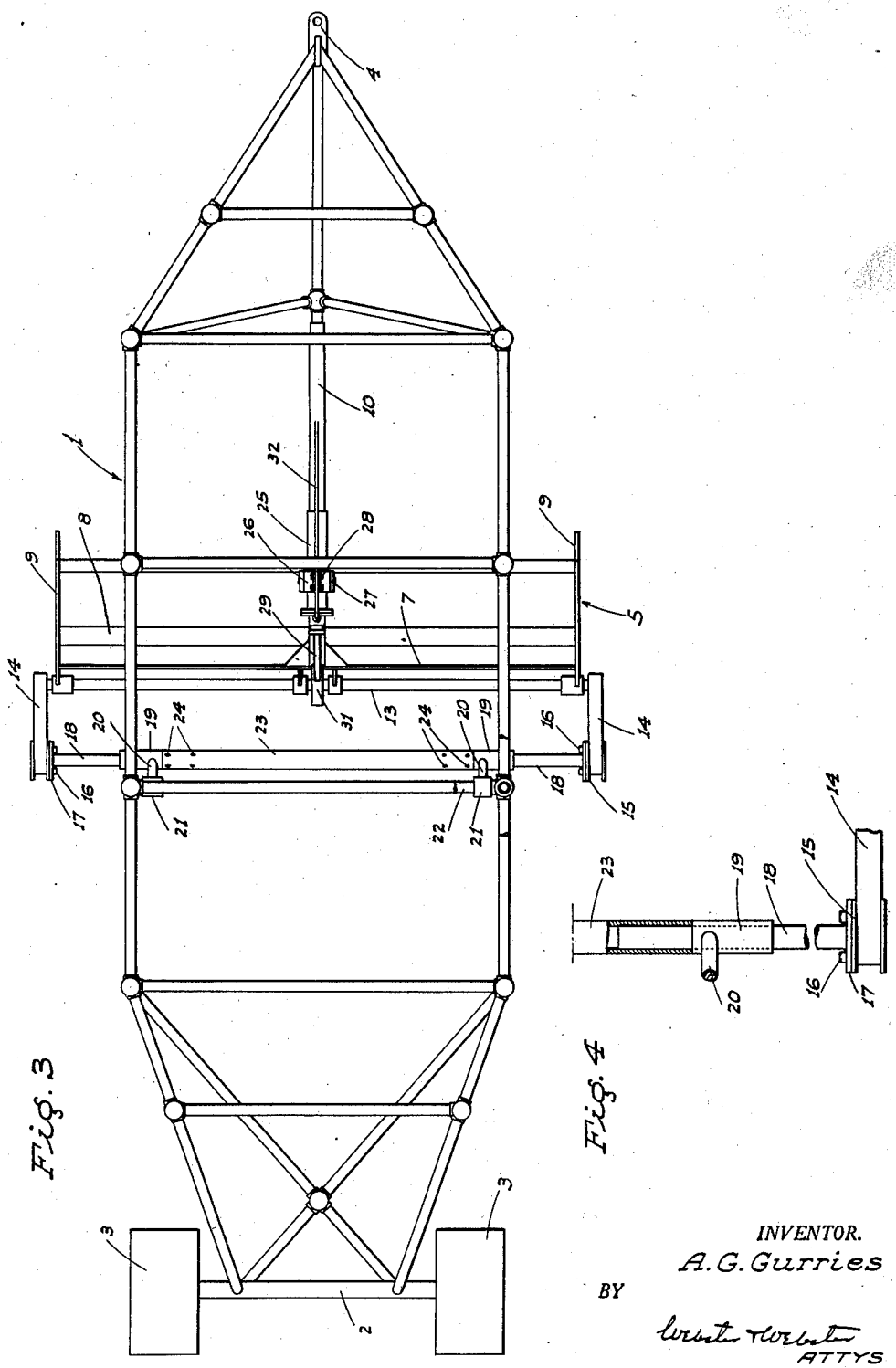

2,407,780

UNITED STATES PATENT OFFICE 2,407,780

FINISHING LEVELER

Albert G. Gurries, Gilroy, Calif.

Application June 11, 1945, Serial No. 598,781

11 Claims. (Cl. 37—169)

This invention relates generally to an improved earth grading implement.

In particular the invention is directed to that type of implement which is known as a finishing leveler or float, and which conventionally includes an extremely elongated, wheel supported frame adapted to be tractor drawn; there being an earth grading scraper suspended from the frame intermediate its ends.

One of the objects of this invention is to provide a finishing leveler, of the type described, which includes an earth grading scraper mounted on the implement in a novel manner; said scraper being arranged for easy adjustment of the cutting depth when the implement is stationary, and said scraper being power actuated to dump the same when the implement is traveling.

Another object of the invention is to provide a finishing leveler wherein the earth grading scraper is detachable from the implement for independent use as a wheel supported drag scraper; the wheels supporting the finishing leveler being usable, if desired, as the supporting wheels for the scraper when so detached for independent use.

A further object of the invention is to provide a finishing leveler in which the earth grading scraper is suspended from the main frame of the implement by novel means which permits of the desired adjustment of the cutting depth of the scraper, while maintaining the same in proper alinement both longitudinally and transversely of the direction of travel.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement in operating position.

Figure 2 is an enlarged fragmentary sectional elevation showing the earth grading scraper in raised or discharging position.

Figure 3 is a plan view of the implement.

Figure 4 is an enlarged fragmentary plan view, partly in section, showing the connecting means between one end of the scraper and the main frame.

Referring now more particularly to the characters of reference on the drawings, the implement comprises an extremely elongated main frame, indicated generally at 1, and which main frame is of truss type and arched somewhat, as shown. At the rear end the main frame 1 includes an axle 2 fitted at opposite ends with ground engaging wheels 3. At the forward end the main frame 1 includes a draft coupling 4 adapted to be connected in draft relation to a tractor.

An earth grading scraper, indicated generally at 5, extends transversely beneath the main frame 1 substantially centrally of the ends of the latter; said scraper being of substantial width, and in the present embodiment of greater width than said main frame. The scraper 5 includes a top frame 6 from which a back wall 7 depends in rigid relation, said back wall being fitted at its lower edge with a cutting blade 8. Side wings 9 depend from the top frame 6 and extend forwardly from opposite ends of the back wall 7.

The forward portion of the scraper is supported by a tongue 10 formed rigid with and projecting forwardly from the top frame 6. The tongue 10 is disposed at a slight forward and downward incline and connects at its front end in vertically swingable relation with a coupling 11 fixed on the rear end of a horizontal drawbar 12 included in the forward portion of the main frame 1; the drawbar 12 direct connecting between the coupling 4 and the coupling 11, and being suitably braced in the main frame, as shown.

At the rear end the scraper is suspended from the main frame 1 as follows:

A cross shaft 13 is journaled in connection with the back wall 7 to the rear thereof, and extends beyond opposite ends of the latter. At said opposite ends the cross shaft 13 is fitted with rearwardly projecting, rigid arms 14 which include attachment discs 15 at their rear ends. The attachment discs 15 are detachably connected by bolts 16 with matching discs 17 on the outer ends of horizontal, inwardly projecting but relatively short spindles 18. The spindles 18 turnably project through and are supported by horizontal, axially alined sleeves 19 carried on the lower end of depending legs 20. The legs 20 include collars 21 at their upper ends which turnably engage about a tubular horizontal cross member 22 in the main frame. A spacing tube 23 extends between the sleeves 19, and the inner end portions of spindles 18 project into opposite ends of said spacing tube and are secured in the latter by set screws 24 carried by said tube. With the above arrangement, the spindles 18 are turnably supported but effectively maintained against lateral outward displacement.

A double acting, longitudinally extending fluid pressure actuated power cylinder 25 is disposed centrally above the scraper; said power cylinder being supported in a clamping jacket 26 tiltably mounted between upstanding ears 27 on the top frame 6 of the scraper. Although normally held against relative lengthwise movement, the cylinder 25 is adjustable lengthwise by loosening the bolts 28 which normally clamp said cylinder in the jacket. The piston rod 29 of the cylinder 25 extends rearwardly to pivotal connection, as at 30, with an upstanding lever arm 31 rigid with the cross shaft 13. Fluid pressure supply conduits 32 lead to opposite ends of the cylinder 25 from a control system, of conventional type, on the tractor.

When the piston rod 29 is retracted into the cylinder, as shown in Fig. 1, the scraper is in lowered position for ground engagement, whereas when the cylinder is actuated to advance said rod 29, the scraper is elevated clear of the ground, as shown in Fig. 2, by virtue of the resultant rearward swinging of lever arm 31 and upward swinging of the arms 14 about the axis of the turnable spindles 18.

When the above described implement is to be used it is first coupled to a tractor in draft relation and the cylinder 25 actuated to retract the piston rod 29. Thereafter the clamping jacket 26 is unloosened and the cylinder 25 adjusted lengthwise so as to position the blade 8 at proper cutting depth, whereupon the clamping jacket 26 is tightened. This sets the scraper in its normal operating position for finish leveling of the land which the implement traverses. However, if during operation of the implement the scraper acquires too great a load of earth, or if trash accumulates in the same, said scraper is elevated by operation of the power cylinder in a direction to advance the rod 29. After the scraper is dumped it is returned to its working position, as shown in Fig. 2.

When the finishing leveler is not in use the scraper 5 may be used independently as a drag scraper by merely detaching the tongue 19 from the coupling 11, and the discs 15 from the discs 17. The scraper is then free of the main frame 1 and ready for independent use upon mounting of wheels in connection with the discs 15 on the rear ends of arms 14. Separate wheels may be provided for this purpose, or if desired the wheels 3 may be arranged so that they can be removed from the axle 2 for attachment to the discs 15.

In order to enable the transverse level of the blade 8 to be adjusted when necessary, the frame supporting wheels 3 are connected thereto by individual rotatably adjustable eccentric wheel-spindle mounts, as indicated at 33.

From the foregoing description it will readily be seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A finishing lever comprising an elongated frame supported above and for movement along the ground, a scraper disposed transversely below the frame intermediate its ends, and means vertically adjustably suspending the scraper from the frame; said means including a forwardly projecting tongue on the scraper pivotally connected to the frame for vertical movement, a pair of transversely spaced, vertically swingable arms projecting rearwardly from the scraper, longitudinally swingable legs depending from the frame to pivotal connection with said arms, and means operative to swing said arms up or down to raise or lower the scraper.

2. A finishing leveler comprising an elongated frame supported above and for movement along the ground, a scraper disposed transversely below the frame intermediate its ends, and means vertically adjustably suspending the scraper from the frame; said means including a forwardly projecting tongue on the scraper pivotally connected to the frame, for vertical movement, a pair of transversely spaced, vertically swingable arms projecting rearwardly from the scraper, longitudinally swingable legs depending from the frame to pivotal connection with said arms, and means operative to swing said arms up or down to raise or lower the scraper; said last named means being power actuated.

3. A finishing leveler comprising an elongated frame supported above and for movement along the ground, a scraper disposed transversely below the frame intermediate its ends, and means vertically adjustably suspending the scraper from the frame; said means including a forwardly projecting tongue on the scraper pivotally connected to the frame for vertical movement, a pair of transversely spaced, vertically swingable arms projecting rearwardly from the scraper, longitudinally swingable legs depending from the frame to pivotal connection with said arms, and means operative to swing said arms up or down to raise or lower the scraper, said last named means being a power cylinder.

4. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame to pivotal connection with said arms, and adjustable means normally preventing relative pivotal movement between said arms and legs.

5. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame to pivotal connection with said arms, and adjustable means normally preventing relative pivotal movement between said arms and legs; the tongue being detachable from the frame, and said arms being detachable from the legs, whereby to permit of separate and independent use of said scraper.

6. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame to pivotal connection with said arms, and adjustable means normally preventing relative pivotal movement between said arms and legs; said adjustable means including a power cylinder.

7. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame to pivotal connection with said arms, a power cylinder mounted on the scraper, and means connecting said cylinder with the arms in actuating relation to the latter.

8. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame to pivotal connection with said arms, a cross shaft on the scraper, said arms being mounted radially on said shaft, a rigid lever arm upstanding from the cross shaft, and a longitudinally extending power cylinder on the scraper and operatively connected between the latter and said lever arm.

9. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame to pivotal connection with said arms, a cross shaft on the scraper, said arms being mounted radially on said shaft, a rigid lever arm upstanding from the cross shaft, and a longitudinally extending power cylinder on the scraper and operatively connected between the latter and said lever arm; the cylinder being normally fixed relative to but longitudinally adjustably mounted on said scraper.

10. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame, transversely alined horizontal sleeves on the lower ends of said legs, inwardly projecting spindles on the arms turnably extending through the sleeves in supported relation, and adjustable means normally preventing relative pivotal movement between said arms and legs.

11. A finishing leveler comprising an elongated frame supported above and for movement along the ground, a scraper disposed transversely below the frame intermediate its ends, a forwardly projecting tongue on the scraper pivotally connected to the frame for vertical movement, a pair of transversely spaced vertically swingable arms projecting rearwardly from the scraper, longitudinally swingable legs depending from the frame, transversely alined horizontal sleeves on the lower ends of said legs, inwardly projecting spindles on the arms turnably extending through the sleeves in supported relation, and adjustable means normally preventing relative pivotal movement between said arms and legs; there being a tubular spacing member extending between the sleeves, the spindles projecting into said member, and securing means between said member and spindles.

ALBERT G. GURRIES.